Figure 5:
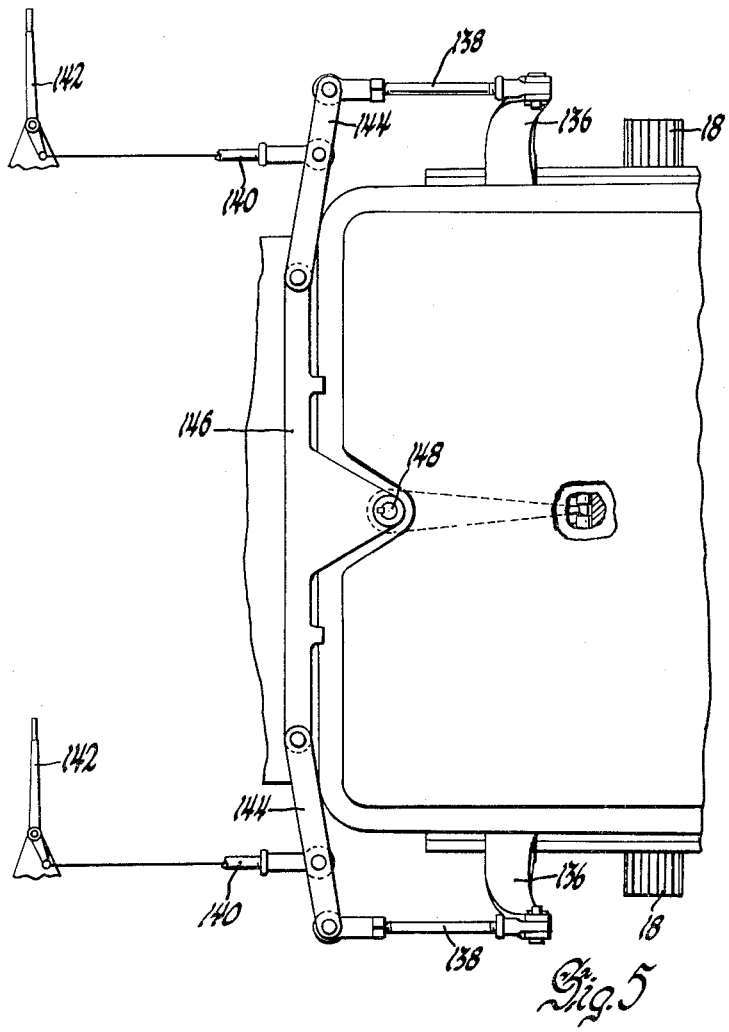

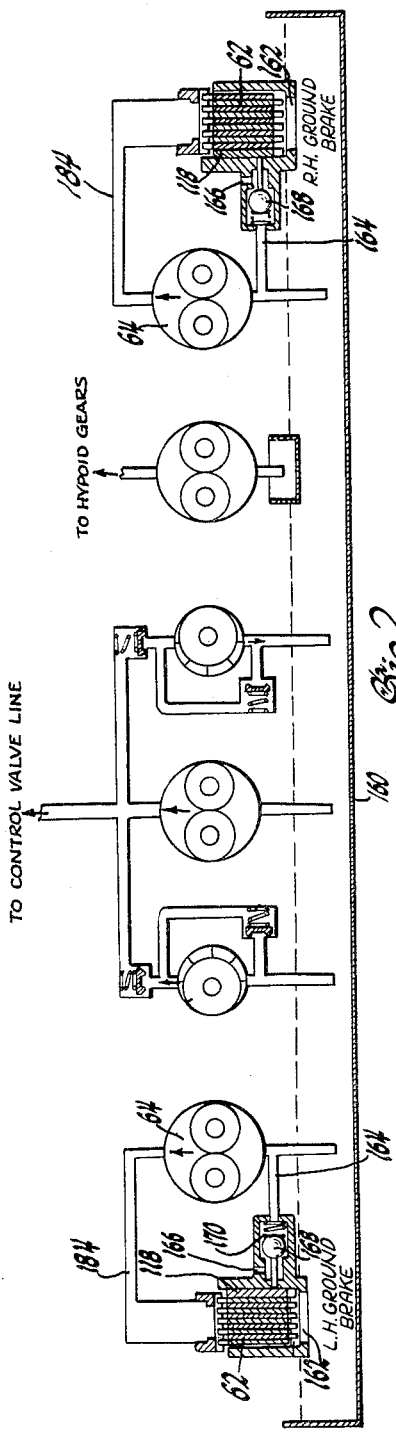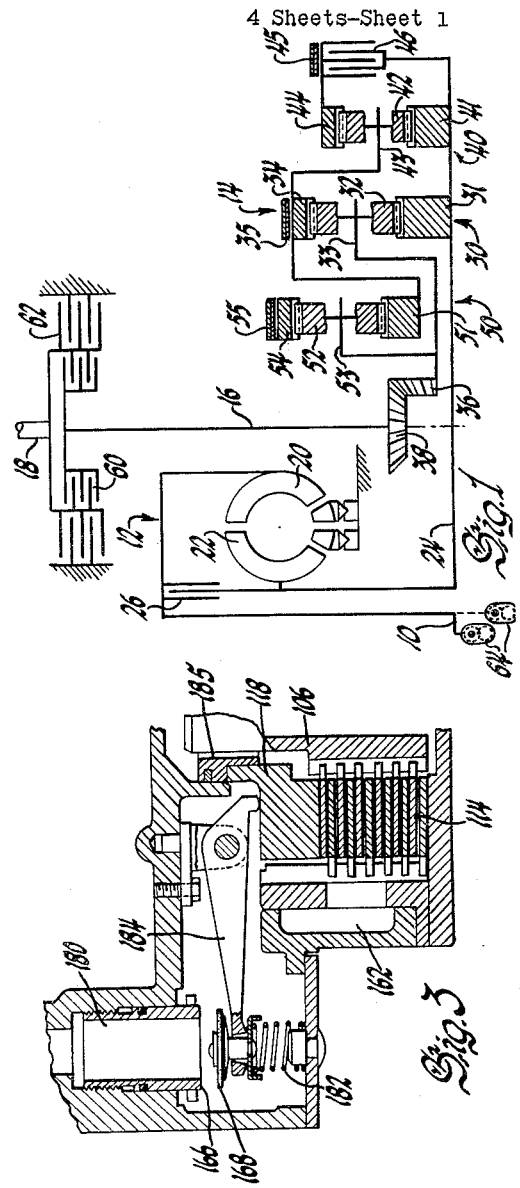

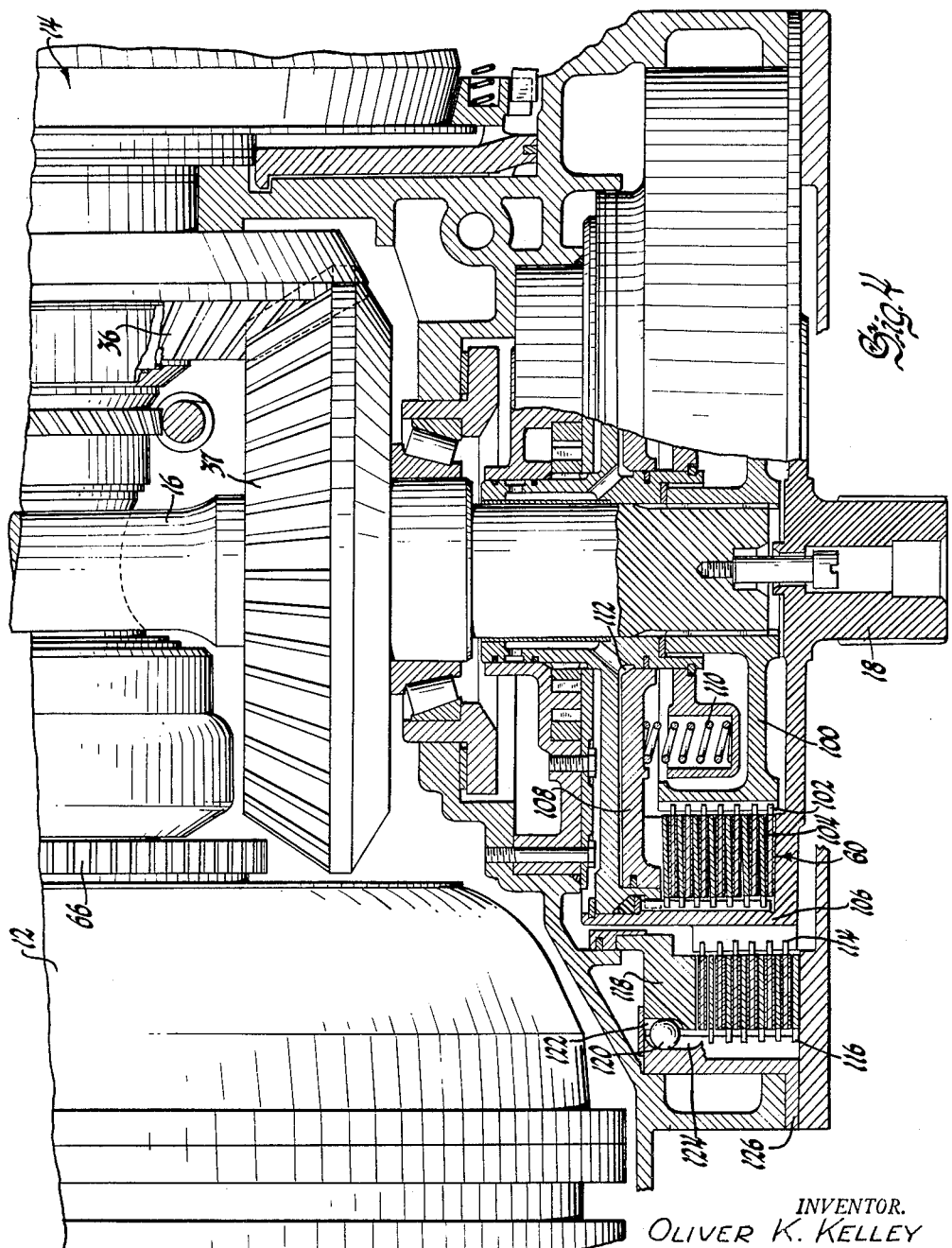

May 8, 1962 O. K. KELLEY 3,033,327
TRANSMISSION
Original Filed Oct. 27, 1952 4 Sheets-Sheet 4
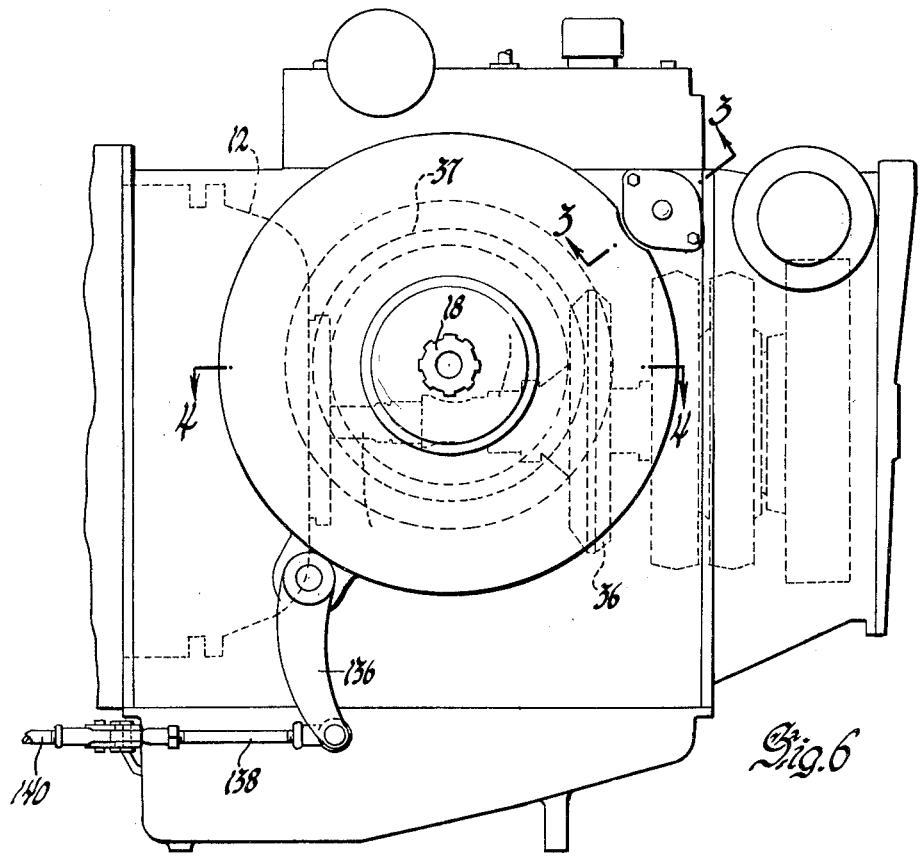
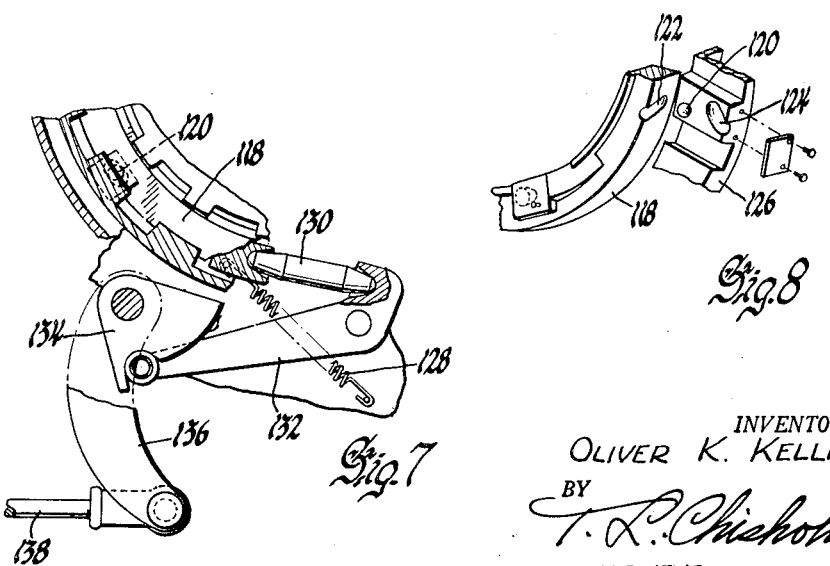
INVENTOR.
OLIVER K. KELLEY
BY
T. R. Chisholm
ATTORNEYS.

United States Patent Office 3,033,327
Patented May 8, 1962

3,033,327
TRANSMISSION
Oliver K. Kelley, Bloomfield Hills, Mich., assignor to General Motors Corporation, Detroit, Mich., a corporation of Delaware
Original application Oct. 27, 1952, Ser. No. 317,095. Divided and this application Aug. 26, 1957, Ser. No. 680,068
5 Claims. (Cl. 188—264)

This application is a division of my application Serial Number 317,095 filed October 27, 1952, now abandoned. Application 731,569 filed April 18, 1958 is a continuation of said application 317,095.

The present invention relates to a transmission for automotive vehicles including steering and braking controls and an improved arrangement for cooling the brakes. It is particularly but not exclusively adapted for tracklaying vehicles and is herein illustrated as applied to such a vehicle.

One of the objects of the invention is to provide an improved construction and arrangement of vehicle brakes wherein coolant is pumped over the brakes when they are in use but is not pumped when the brakes are not being used. It is a more specific object to provide a continuously running pump which is normally vented so that it pumps air when the brakes are not in use, and so requires little power and having means for automatically closing the vent when the brakes are applied so as to pump coolant automatically whenever brakes are applied.

Other objects and advantages of the present invention will be apparent in the annexed specification and in the accompanying drawings in which:

FIGURE 1 is a schematic representation of a transmission embodying one form of my invention, the figure being one-half of a symmetrical horizontal section through the axis of the transmission.

FIGURE 2 is a schematic hydraulic diagram of the brake-cooling system and of a portion of the hydraulic control system for the rest of the transmission, FIGURE 3 is a section of one form of actual construction of a portion of the brake and the apparatus for venting the cooling pump, being taken on the line 3—3 of FIG. 6, FIGURE 4 is a horizontal sectional view through the axis of one form of actual construction of drive wheel, on the line 4—4 of FIG. 6, FIGURE 5 is a top-plan view of the exterior of the casing of the transmission showing steering and braking linkages, FIGURE 6 is a side elevation of the structure shown in FIGURE 5, FIGURE 7 is a side elevation partly broken away of a portion of the brake operating apparatus shown in FIG. 6, and FIGURE 8 is a perspective exploded view of a portion of the brake-operating apparatus shown in FIG. 7.

In FIG. 1 an engine driven shaft 10 drives a torque converter 12 which drives planetary gearing designated as a whole by 14 which drives an output or cross shaft 16. Only half of the cross shaft is shown, it being understood that the half illustrated is duplicated on the opposite side of the axis of shaft 10. At each of its ends the cross shaft drives an output hub 18 which may carry any suitable vehicle propelling device such as a sprocket wheel for an endless track.

The torque converter includes an impeller 20 driven by the engine shaft 10 and a turbine 22 which is connected to a shaft 24 which is both the torque converter output shaft and the gearing input shaft. The engine shaft 10 may be directly connected to the torque converter output shaft 24 by a lock-up clutch 26 operated by any suitable fluid pressure device, not shown. The gearing 14 may include a low speed planetary gear set 30, a second and third speed planetary gear set 40 and a reverse planetary gear set 50. The low speed planetary gear set includes an input sun gear 31 driven by the torque converter output shaft 24, meshing with planet gears 32 mounted on a carrier 33 and meshing with a ring gear 34 which can be held by a band 35 to drive the carrier 33 at a low speed ratio forward. The carrier 33 is connected by bevel gears 36 and 37 to the cross shaft 16. The second and third speed planetary gear set 40 includes an input sun gear 41 driven by the torque converter output shaft 24, meshing with planet gears 42 mounted on a carrier 43 and meshing with a ring gear 44 which may be held by a band 45. The carrier 43 is connected to ring gear 34, so that when the band 45 is set and the band 35 is released, second speed is established by driving the ring gear 34 forward which causes the carrier 33 to rotate forward faster than when the ring gear 34 is held as in first speed.

Third speed is effected by locking the ring gear 44 to the sun gear 41 by the clutch 46, the bands 34 and 35 being released. This causes all of the elements of the planetary gearsets 30 and 40 to rotate with the shaft 24 and effects direct or one-to-one drive of the bevel gear 36.

The reverse gearset 50 includes a sun gear 51 meshing with planet gears 52 mounted on a carrier 53 and meshing with a ring gear 54 which can be held by a band 55. The carrier 53 is connected to the bevel gear 36. The sun gear 51 is connected to the ring gear 34 and to the carrier 43. Reverse drive is effected by setting the band 55 and releasing the bands 35 and 45 and the clutch 46. When the shaft 24 begins to turn forward with the reverse band 55 set, the sun gear 31 tends to rotate the ring gear 34 backward because the vehicle holds the carrier 33 stationary. Reverse rotation of the ring gear 34 rotates the sun gear 51 backwards, which because the ring gear 54 is held, drives the carrier 53 backward and so drives the vehicle backward.

At each end of the cross shaft 16, that is on either side of the vehicle, is a drive hub 18 which is driven by the shaft 16 whenever a drive clutch 60 is engaged. The drive hub may be braked to retard motion of the vehicle or to steer by the ground brake 62.

The various transmission brakes, ground brakes and clutches may be engaged by any suitable pressure-operated devices as is known, or as shown in parent application, S.N. 317,095. These devices are operated when desired by fluid under pressure applied by any suitable source such as a pump driven by the engine shaft and/or a pump driven by the shaft 16, as is known.

The engine shaft 10 drives suitable pumps 64 for supplying the brakes 62 with lubricating and cooling oil, as shown in the parent application. Each pump 64 supplies one brake 62.

One form of actual structure of the cross shaft, driving clutch, ground clutch and driving hub is shown in FIG. 4. The torque converter 12 is located at the upper left-hand corner of the figure and carries a gear 66, which drives the brake cooling pumps 64. The gear 66 is conveniently attached to the impeller shell of the torque converter. The planetary gearing 14 is indicated in the upper-right hand corner of the figure and this drives the bevel gear 36 which meshes with bevel gear 37 which is keyed to the cross shaft 16. Also keyed to the cross shaft is the driving hub 100 of the drive clutch 60 to which are splined plates or discs 102 interleaved between plates or discs 104 splined to a clutch drum 106 integral with the drive hub 18. The clutch plates 102, 104 may be engaged by a piston 108 which may be set against return springs 110 by pressure of oil in the chamber 112 which is supplied from any suitable source of pressure. The hub 106 has splined to its outer surface driven brake discs 114 interleaved between stationary brake discs 116 suitably splined to the frame of the transmission and the brake housing. The brakes may be set by a pressure ring 118 which may be moved down as FIGS. 3 and 4 are seen by balls 120 operating in cam grooves 122 and 124, respectively, in the pressure ring 118 and in a ring 126 forming part of the stationary casing. The rings 126 and 118 are held together axially by any suitable means and the ring 118 is constantly urged by a release spring 128 (FIG. 7) to rotate toward a position in which the balls 120 will be in the deep ends of the cam grooves 122 and 124. This releases the brake. The ring 118 may be rotated against the release or return spring 128 to engage the brake by a strut 130 moved toward the left as FIG. 7 is seen by a lever 132 rotated counterclockwise as FIG. 7 is seen by a cam 134 on an arm 136 which may be rotated clockwise as FIG. 7 is seen by a link 138.

As shown in FIG. 5 each link 138 may be drawn to the left as FIG. 5 is seen by a cable 140 operated by a steering lever 142. The cable 140 also operates a lever 144 pivoted to one end of a lever 146 keyed at 148 to a shaft which operates any suitable steering valve which selectively directs pressure fluid to the clutches 60 of the hubs 18 and releases fluid from them. Whenever the steering lever 146 is in its central position oil is directed to both clutch chambers 112, the brakes 62 are released and the vehicle drives in a straight line. If both levers 142 are rocked in an equal amount counterclockwise as FIG. 5 is seen, the steering lever 146 is not moved but both brake arms 136 are moved to apply both ground brakes 62. This brakes the vehicle without steering, the clutches 60 being released if desired by other means.

The vehicle is steered by releasing one clutch 60 and applying the brake 62 on that side by operating the appropriate lever 142 without moving the other one. The lever 144 rocks the steering lever 146 about its shaft 148 and this releases oil from the corresponding clutch chamber 112, while the cable 140 through link 138 moves the corresponding pressure ring 118 to cause the balls 120 to apply the corresponding brake.

FIG. 2 shows a diagrammatic illustration of the brake cooling system and a portion of the general control system. The engine-driven brake cooling pumps 64 can take in oil from a common sump 160 and each pump discharges to its own brake 62. The oil flows over and between the brake discs and is discharged through an outlet 162 leading to the sump. The pump can be prevented from taking in oil from the sump and hence from delivering oil to the brakes by a vent line 164 which opens its intake to the atmosphere above the level of oil of the sump at a vent port 166 controlled by a brake-position-responsive valve 168. When the brake is disengaged the pressure plate 118 holds the valve 168 off from its seat against a return spring 170 so that the vent port 166 is open causing the constantly operating pump to circulate air which requires very little power. Whenever the brake is applied the pressure ring 118 is moved to the left as FIG. 2 is seen in the case of the left-hand brakes allowing the valve 168 to close the port 166; immediately the pump begins to take in oil and discharge oil over the brake plates. Thus, the pump discharges a full flow of cooling oil to the brake whenever the brake is being engaged and pumps air over the brake, reducing the power required to drive the pump, whenever the brake is not engaged.

FIG. 3 is a section on the line 3—3 of FIG. 6 showing one form of actual structure of the brake and its arrangement for controlling the vent valve 168. The vent port 166 may be formed by the end of a pipe 180 which communicates with the atmosphere; that is, with the inside of the transmission casing. Valve 168 is formed as a disc urged against the end of the pipe by a return spring 182 and supported on a lever arm 184 which is urged counterclockwise as FIG. 3 is seen by the pressure ring 118 when the brake is released. This holds the valve off the seat and vents the intake of the pump. Whenever the brake is applied the pressure ring 118 moves downward as FIG. 3 is seen under the action of the balls 120 and cam slots 122 and 124, and the spring 182 seats the valve 168 on the pipe 180 to close the vent. Oil from the pumps enters the brake chamber through the duct 185 and after flowing over the plates or discs leaves the brake chamber from the outlet 162 from which the oil returns to the sump.

I claim:

1. Apparatus for cooling a friction torque-establishing device having engageable and disengageable friction surfaces comprising in combination, a pump having its intake connected to a source of liquid for discharging liquid in heat-exchanging relationship with the friction surfaces, a vent in the intake which when open prevents liquid from being taken into the pump, means for opening and closing the vent, means responsive to the condition of the friction surfaces being disengaged for acting on said last-named means to open the vent, means for at times engaging the friction surfaces, and means responsive to operation of the engaging means for closing the vent.

2. Apparatus for cooling a friction torque-establishing device having engageable and disengageable friction surfaces comprising in combination a pump having its intake connected to a source of liquid for discharging liquid in heat-exchange relationship with the friction surfaces, means for continuously operating the pump, a vent in the intake which when open prevents liquid from being taken into the pump, means for opening and closing the vent, means for continuously urging the last-named means to close the vent, and means responsive to the condition of the friction surfaces being disengaged for overcoming the urging means and opening the vent.

3. Apparatus for cooling a friction torque-establishing device having engageable and disengageable friction surfaces comprising in combination a pump having its intake connected to a source of liquid for discharging liquid in heat-exchange relationship with the friction surfaces, means for continuously operating the pump, a vent in the intake which when open prevents liquid from being taken into the pump, a valve for opening and closing the vent, means for continuously urging the valve to close the vent, and means responsive to the condition of the friction surfaces being disengaged for overcoming the urging means and opening the vent.

4. Apparatus for cooling a friction brake comprising in combination, an engageable and disengageable friction brake, a pump having its intake connected to a source of liquid for discharging liquid in heat-exchange relation with the brake, means for continously operating the pump, a vent in the intake which when open prevents liquid from being taken into the pump, means for disengaging the brake, a valve adapted to open and close the vent, means constantly yieldingly urging the valve to close the vent, and means responsive to disengagement of the brake for opening the valve.

5. A motor vehicle comprising in combination, means for propelling the vehicle, a brake for retarding the vehicle, means for engaging and disengaging the brake, a source of liquid coolant for the brake, a pump having its intake connected to the source and discharging coolant in heat-exchange relation to the brake, driving means continuously connecting the pump to the propelling means, a vent in the pump intake which when open prevents liquid being taken into the pump, a valve for opening and closing the vent, means responsive to the condition of the brake being disengaged for opening the valve, and means responsive to engagement of the brake for closing the valve.

References Cited in the file of this patent

UNITED STATES PATENTS

| | | |
|---|---|---|
| 903,068 | Enrico | Nov. 3, 1908 |
| 2,004,793 | Montgomery | June 11, 1935 |
| 2,158,440 | Spase | May 16, 1939 |
| 2,393,768 | Graham | Jan. 29, 1946 |
| 2,496,497 | Russel | Feb. 7, 1950 |
| 2,498,123 | Hobbs | Feb. 21, 1950 |
| 2,596,931 | Kelley | May 13, 1952 |
| 2,615,542 | LeToureau | Oct. 28, 1952 |
| 2,733,797 | Almen | Feb. 7, 1956 |

FOREIGN PATENTS

| | | |
|---|---|---|
| 514,017 | France | Nov. 8, 1920 |